(12) United States Patent
Grace

(10) Patent No.: US 7,474,857 B2
(45) Date of Patent: Jan. 6, 2009

(54) RECOVERING ENERGY FROM AN IRDA/REMOTE CONTROL TRANSMITTER CIRCUIT

(75) Inventor: Alan Grace, South San Francisco, CA (US)

(73) Assignee: ZiLOG, Inc., San Jose, CA (US)

( * ) Notice: Subject to any disclaimer, the term of this patent is extended or adjusted under 35 U.S.C. 154(b) by 508 days.

(21) Appl. No.: 10/897,290

(22) Filed: Jul. 21, 2004

(65) Prior Publication Data

US 2006/0018662 A1    Jan. 26, 2006

(51) Int. Cl.
H04B 10/08    (2006.01)
(52) U.S. Cl. .................. 398/182; 398/106; 323/232
(58) Field of Classification Search ............... 398/128, 398/106, 182; 323/232
See application file for complete search history.

(56) References Cited

U.S. PATENT DOCUMENTS

| | | | | |
|---|---|---|---|---|
| 4,558,285 | A | * | 12/1985 | Shrestha et al. .............. 330/53 |
| 4,912,620 | A | | 3/1990 | O'Dell .......................... 363/20 |
| 5,652,561 | A | | 7/1997 | Inoh et al. .................... 336/200 |
| 6,014,236 | A | * | 1/2000 | Flaherty ........................ 398/66 |
| 6,075,295 | A | * | 6/2000 | Li .................................. 307/39 |
| 6,208,534 | B1 | | 3/2001 | Shteynberg et al. .......... 363/21 |
| 6,504,351 | B2 | * | 1/2003 | Eagar et al. ................. 323/282 |
| 6,606,174 | B1 | * | 8/2003 | Ishikawa et al. ............ 398/135 |
| 6,998,647 | B2 | * | 2/2006 | Morimoto et al. ............ 257/99 |
| 7,061,214 | B2 | * | 6/2006 | Mayega et al. .............. 323/267 |
| 2003/0103088 | A1 | * | 6/2003 | Dresti et al. ................. 345/835 |
| 2003/0132715 | A1 | * | 7/2003 | Buell et al. ............... 315/169.3 |
| 2004/0213576 | A1 | | 10/2004 | Tan et al. ..................... 398/140 |
| 2006/0114118 | A1 | * | 6/2006 | Toulmin et al. ......... 340/815.45 |

FOREIGN PATENT DOCUMENTS

| EP | 1054423 A1 | 11/2000 |
|---|---|---|
| EP | 1345341 A2 | 9/2003 |
| JP | 60178735 | 9/1985 |

OTHER PUBLICATIONS

"Interfacing the Agilent HSDL-3002 for Remote Control Operation," Application Note 1314 by Agilent Technologies, Inc., Feb. 18, 2003, 16 pages. (ISBN: 5988-7936EN).

(Continued)

*Primary Examiner*—Leslie Pascal
(74) *Attorney, Agent, or Firm*—Imperium Patent Works; T. Lester Wallace; Darien K. Wallace

(57) ABSTRACT

A portable electronic device with an IrDA transmitter LED is used to transmit both IrDA signals and remote control infrared signals. The device transmits remote control infrared signals with reduced power consumption. During a relatively longer remote control signal pulse, an inductor saturates and stores energy when a drive current flows from a power supply, through the inductor and then through the LED. An energy-transferring circuit transfers a portion of the energy stored in the inductor to the power supply. Energy is transferred when the drive current is cut and the voltage across the inductor surges, which causes an overflow current to flow through a diode in the energy-transferring circuit and to the power supply. The inductor is a planar coil of traces on a printed circuit board and therefore costs less to manufacture than does a toroidal coil of wires.

29 Claims, 7 Drawing Sheets

OTHER PUBLICATIONS

"Agilent IrDA Data Link Design Guide," by Agilent Technologies, Inc., Mar. 26, 2003, 67 pages. (Doc. No. 5988-9321EN).

"Agilent HSDL-3003 IrDA Data Compliant Low Power 115.2 kbit/s with Remote Control Infrared Transceiver," Data Sheet by Agilent Technologies, Inc., Jun. 11, 2003, 21 pages. (Doc. No. 5988-9510EN).

"Utilizing a Vishay IrDA Transceiver for Remote Control," Application Note by Vishay Semiconductors, Feb. 20, 2004, 14 pages. (Doc. No. 82606).

Webpage entitled "Infrared transceivers—Vishay—Remote control applications" downloaded on Feb. 24, 2004 from www.vishay.com/ir-transceivers/remote-list/ , 5 pages.

* cited by examiner

US 7,474,857 B2

RECOVERING ENERGY FROM AN IrDA/REMOTE CONTROL TRANSMITTER CIRCUIT

TECHNICAL FIELD

The present invention relates generally to infrared transceivers and, more specifically, to a combined transceiver for both IrDA signals and remote control infrared signals.

BACKGROUND

Infrared transceivers that conform to specifications known as IrDA (Infrared Data Association) are typically used in portable electronic devices, such as personal digital assistants (PDAs), cell phones, pagers, digital cameras, portable MP3 players and laptop computers. The IrDA specifications call for infrared signals having wavelengths approximately in the range of 850 nm to 900 nm (for example, 875 nm). Transmitters used in remote control devices that control electronic consumer devices typically transmit remote control infrared signals. Remote control devices typically use infrared signals with wavelengths approximately in the range of 900 nm to 1000 nm (for example, 940 nm). In addition to the IR wavelength, the transmission protocols for IrDA signals and remote control infrared signals are very different. Although the various manufacturers of electronic consumer devices use different coding and modulation schemes to control their electronic consumer devices, the signals used to control all such electronic consumer devices are referred to here as "RC" infrared signals. RC infrared signals typically control electronic consumer devices such as televisions, stereo radios, digital video disc players, video cassette recorders, set-top cable television boxes and set-top satellite boxes.

A transmitter that can emit both IrDA signals and RC infrared signals could be used in both portable electronic devices as well as remote control devices. In addition, a portable electronic device containing a transmitter that can transmit both IrDA signals and remote control infrared signals can be used to control electronic consumer devices. For example, an 875 nm IrDA transmitter light-emitting diode (LED) could be used as to transmit both IrDA signals and RC infrared signals. Although the peak wavelength of the 875 nm IrDA transmitter LED and the wavelength of peak sensitivity of a remote control receiver are not matched, radiation emitted by the 875 nm transmitter LED is nevertheless received by the remote control receiver. Generating IrDA signals and RC infrared signals with one transmitter LED, however, presents technical difficulties.

First, due to the mismatch between peak IrDA transmission wavelength and peak RC reception sensitivity, it may be necessary to increase the power to the IrDA transmitter LED to achieve sufficient reception by the remote control receiver. The increased power consumption of the IrDA transmitter LED reduces battery life. A portable electronic device with a longer battery life, however, is more attractive to consumers. Being able to extend battery life is very valuable. Battery life is therefore often a very important design consideration for portable electronic devices, such as personal digital assistants (PDAs). Thus, a technique is sought whereby power consumption in a combined IrDA/remote control transceiver can be reduced.

Second, the cost of portable electronic devices is also an important consideration for consumers. Driving down the manufacturing cost of the PDA, and the combined IrDA/remote control transceiver within the PDA, is an important objective. A method and structure for reducing manufacturing costs of price-sensitive portable electronic devices, such as PDAs, that generate both IrDA signals and RC infrared signals is desired.

SUMMARY

A portable electronic device, such as a personal digital assistant (PDA), with an IrDA transmitter LED is used to transmit both IrDA signals and remote control infrared signals. The PDA transmits remote control infrared signals with reduced power consumption. During a relatively shorter pulse of an IrDA signal, the LED drive current does not saturate and flow through an inductor in a current-limiting circuit. During a relatively longer remote control signal pulse, however, the inductor saturates and stores energy when the LED drive current flows from a power supply, through the inductor and then through the transmitter LED. An energy-transferring circuit transfers a portion of the energy stored in the inductor to the power supply. Energy is transferred when the LED drive current ends and the voltage across the inductor surges, which causes an overflow current to flow through a diode in the energy-transferring circuit and to the power supply.

A method of generating an IrDA signal in an IrDA mode and a remote control infrared signal in a remote control mode from an IrDA transmitter LED stores energy in an inductor in the remote control mode. No appreciable amount of energy is stored in the inductor in the IrDA mode. The method conserves energy in the remote control mode by passing an LED drive current-through the inductor and the transmitter LED such that the inductor saturates. The LED drive current is stopped from flowing through the transmitter LED, and at least a portion of the energy stored in the inductor is transferred to a power supply.

In a second aspect, the inductor is manufactured in a cost efficient manner. The inductor is a planar coil of traces on a printed circuit board and therefore costs less to manufacture than does a toroidal coil of wires.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
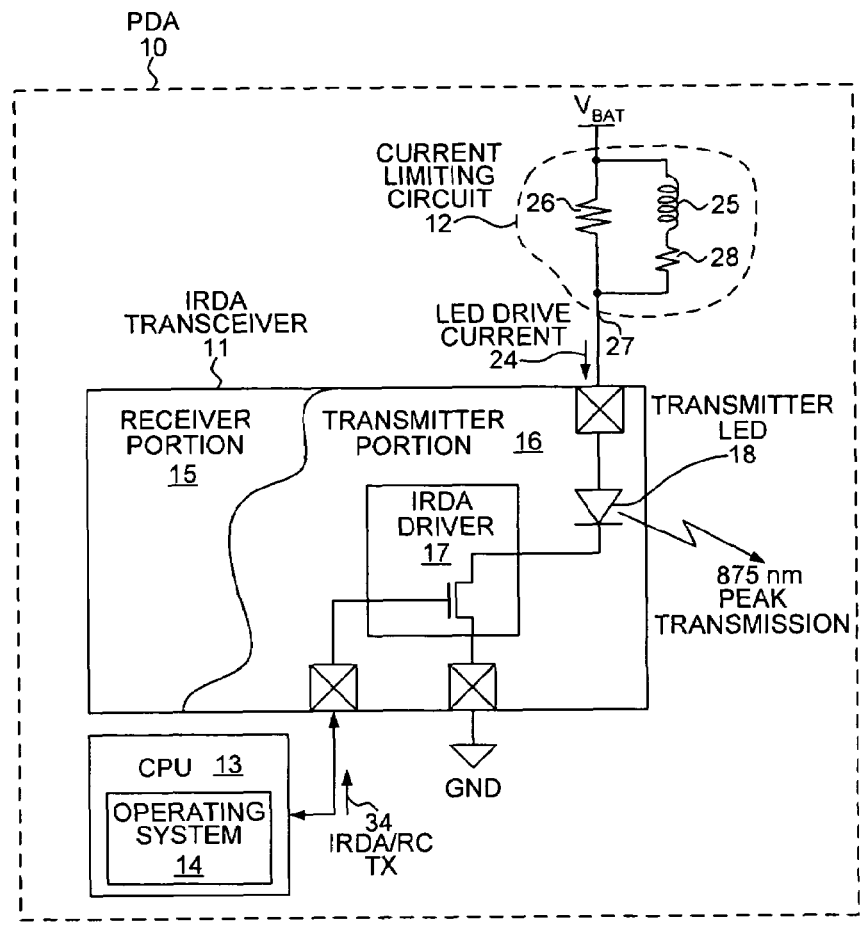
FIG. 1 is a simplified block diagram of a PDA with a transceiver for both IrDA signals and remote control infrared signals.

FIG. 1 is a simplified block diagram of a personal digital assistance (PDA) 10 containing an IrDA transceiver 11 that is used to transmit both IrDA signals and remote control (RC) infrared signals. PDA 10 includes IrDA transceiver 11, a current-limiting circuit 12, a central processing unit 13 of PDA 10, and an operating system 14 running on CPU 13. IrDA transceiver 11 includes a receiver portion 15 and a transmitter portion 16. Transmitter portion 16 includes an IrDA driver portion 17 and a transmitter light-emitting diode (LED) 18. Transmitter LED 18 is used to generate both IrDA signals and RC infrared signals over a range of wavelengths from about 875 nm (IrDA signals) to about 940 nm (RC infrared signals). For additional details on IrDA transceivers that transmit both IrDA signals and RC infrared signals, see U.S. patent application Ser. No. 10/788,180 entitled "IrDA Transceiver Module That Also Functions As Remote Control IR Transmitter," filed on Feb. 25, 2004, which is herein incorporated by reference.

In one embodiment, transmitter LED 18 is a typical IrDA LED that emits signals at 875 nm. By increasing the transmission power of transmitter LED 18 at 875 nm, the amount of energy also transmitted at 940 nm can be made sufficiently large such that transmitter LED 18 can be used to make remote control transmissions to an electronic consumer device with a remote control receiver. For example, PDA 10 can be used to transmit key codes to an electronic consumer device, such as a television, a stereo radio, a digital video disc player, a video cassette recorder, a set-top cable television box or a set-top satellite box. Codesets containing the key codes for the various electronic consumer devices that are to be controlled are stored in the memory of PDA 10. Each key code corresponds to a function of the selected electronic consumer device, such as power on, power off, volume up, volume down, mute, play, stop, select, channel up, channel down, etc.

Figure 2:
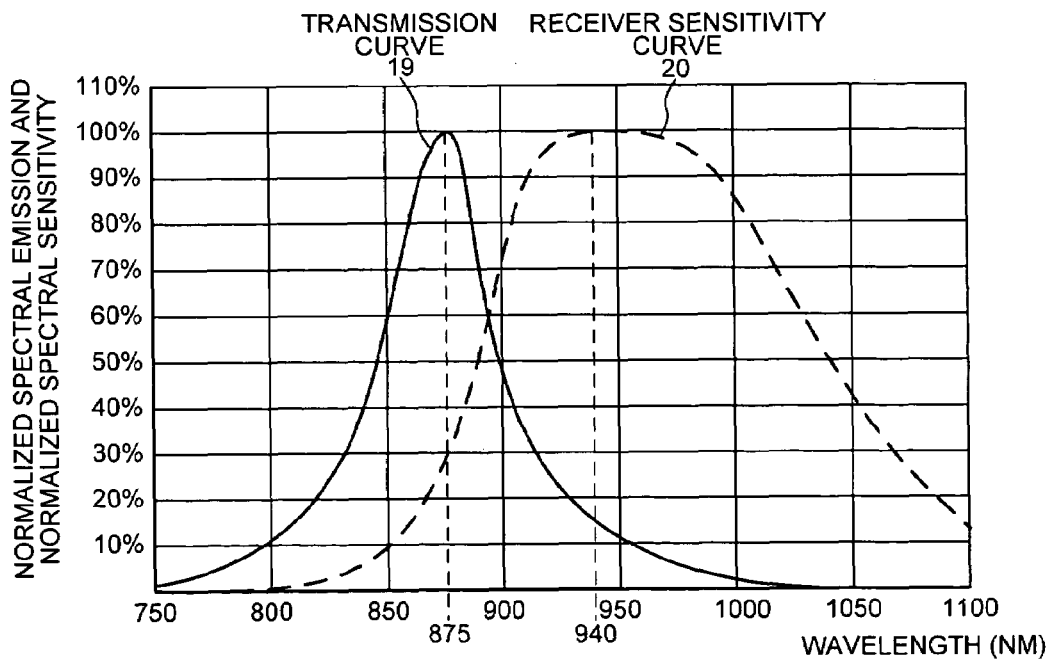
FIG. 2 is a graph showing transmission power at various wavelengths for the combined IrDA/RC transceiver of FIG. 1.

FIG. 2 is a graph showing the relative power of signals transmitted by transmitter LED 18 at various wavelengths. FIG. 2 shows a transmission curve 19 of transmitter LED 18 with a peak power emission at about 875 nm. The peak power is represented with a magnitude of 100%. FIG. 2 also shows a dashed receiver sensitivity curve 20 for a typical remote control receiver in an electronic consumer device. Receiver sensitivity curve 20 illustrates that, although peak sensitivity is at 940 nm, a typical remote control receiver also exhibits at least 50% sensitivity for signals with wavelengths between about 890 nm to 1040 nm. Thus, transmission curve 19 and receiver sensitivity curve 20 overlap such that transmitter LED 18 emits signals having about 60% of peak power at 890 nm, and a typical remote control receiver receives signals with about 60% of peak sensitivity at 890 nm.

Figure 3:
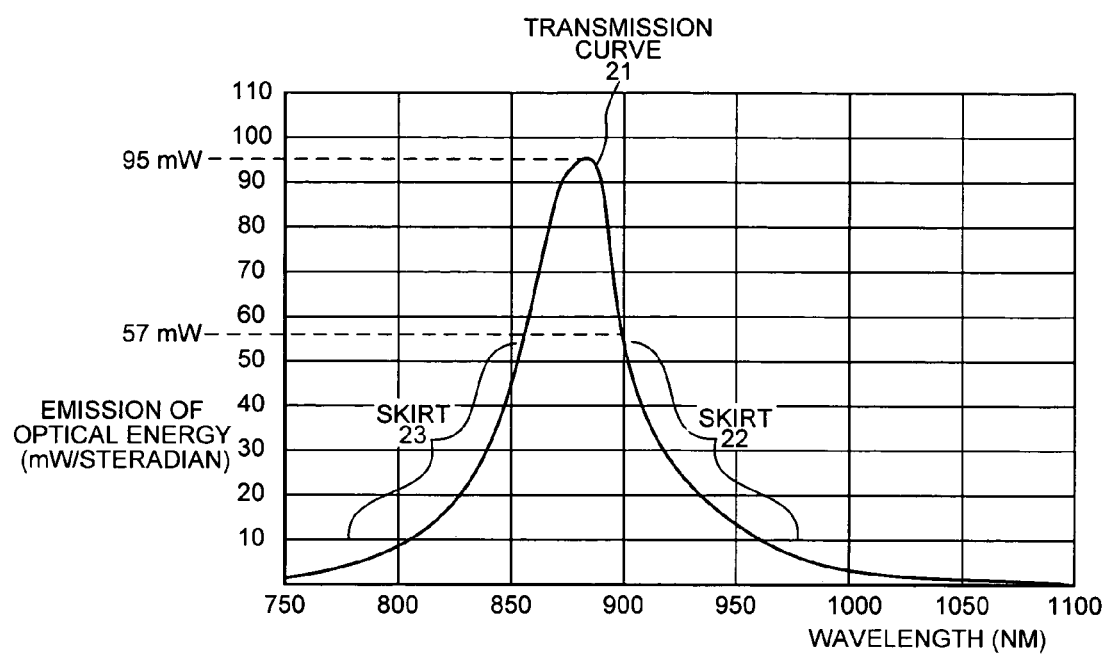
FIG. 3 is a graph of the optical emission energy at various wavelengths for the combined IrDA/RC transceiver of FIG. 1.

FIG. 3 is a graph of a transmission curve 21 of transmitter LED 18 showing the relationship between the optical emission energy in mW/steradian versus the wavelength of signals transmitted by transmitter LED 18. Current is increased through transmitter LED 18 until signals are emitted at 900 nm with sufficient energy to be received by a typical remote control receiver. When current is increased through transmitter LED 18 until peak emission energy at 875 nm is about 95 mW/steradian, transmitter LED 18 also emits signals at 900 nm with about 57 mW/steradian of energy, which is sufficient for remote control receiver operation. Signals emitted by transmitter LED 18 in skirts 22 and 23 of transmission curve 21 having wavelengths above 900 nm and below 855 nm, respectively, have optical energy of less than 57 mW/steradian. Typical remote control receivers may not have sufficient sensitivity dependably to receive signals at 900 nm with optical energy of less than 57 mW/steradian.

IrDA transceiver 11 and current-limiting circuit 12 of FIG. 1 function together to enable transmitter LED 18 to generate both IrDA signals and RC infrared signals. Current-limiting circuit 12 generates an LED drive current 24 that powers transmitter LED 18. Current-limiting circuit 12 of PDA 10 in FIG. 1 works by taking advantage of the fact that RC infrared signals are transmitted with longer bursts of infrared energy (approximately 10 microseconds), whereas IrDA signals are transmitted with shorter bursts of infrared energy (approximately 1.6 microseconds).

During a short IrDA pulse, an inductor 25 of current-limiting circuit 12 is not conducting a significant amount of current, and current flow through current-limiting circuit 12 is limited by a first current-limiting resistor 26. Inductor 25 and first resistor 26 are configured in parallel between a battery power source $V_{BAT}$ and IrDA transceiver 11. An output lead 27 of current-limiting circuit 12 is coupled to transmitter LED 18. The resistivity of first resistor 26 is chosen to limit LED drive current 24 that flows into transmitter LED 18 to a relatively low level suitable for IrDA transmissions.

During a relatively longer remote control pulse, inductor 25 of current-limiting circuit 12 conducts increasing amounts of current. A magnetic field builds up in inductor 25 until the core of inductor 25 saturates and effectively becomes a short. Current flow through current-limiting circuit 12 is then limited by the equivalent resistance of first resistor 26 and a second current-limiting resistor 28 that is configured in series with inductor 25 and in parallel with first resistor 26. The peak amount of current that flows when the core of inductor 25 saturates is a current level suitable for remote control transmissions. The value of second resistor 28 is chosen to limit LED drive current 24 flowing into transmitter LED 18 at the higher level required for the remote control transmissions.

Figure 4:
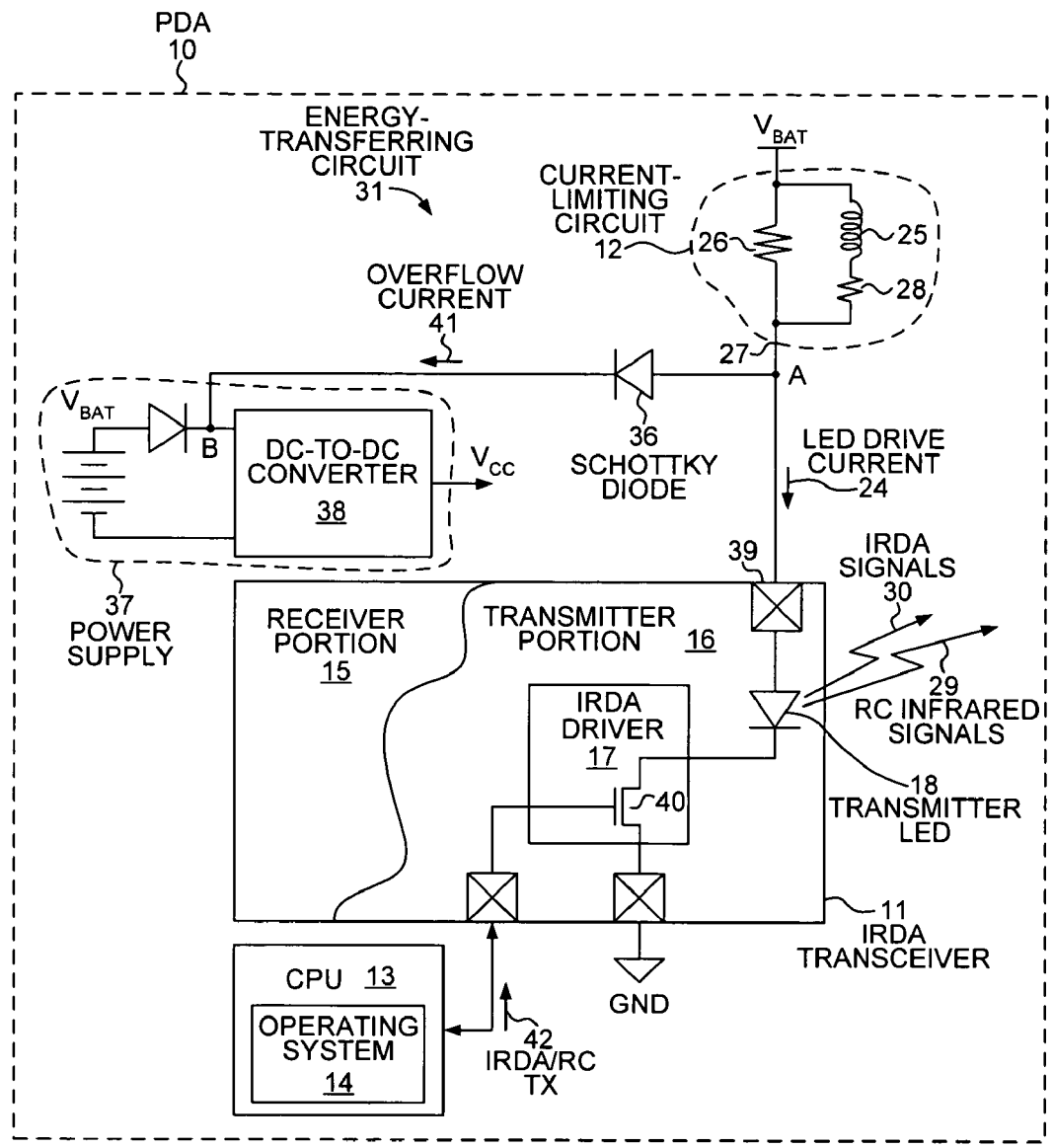
FIG. 4 is a simplified block diagram of a combined IrDA/RC transceiver, a current-limiting circuit and an energy-transferring circuit in accordance with one embodiment of the invention.

FIG. 4 is a diagram in accordance with one embodiment of the invention. FIG. 4 illustrates a first aspect of reduced power consumption where one transmitter LED operates both in an IrDA mode and in a remote control mode. In the IrDA mode, IrDA transceiver 11 generates IrDA signals 30. In remote control mode, IrDA transceiver 11 generates RC infrared signals 29. PDA 10 includes an energy-transferring circuit 31 that conserves energy in the remote control mode.

Figure 5:
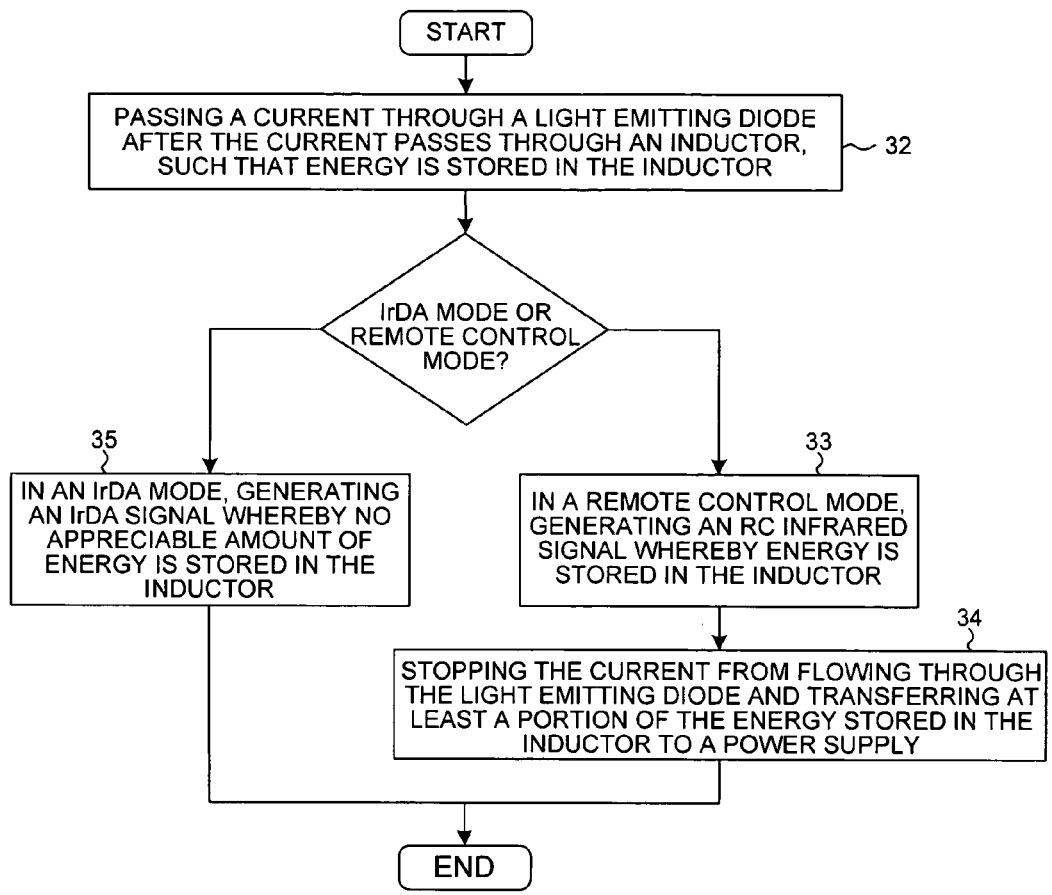
FIG. 5 is a flowchart of steps for generating both IrDA signals and RC infrared signals from an LED with reduced power consumption.

FIG. 5 is a flowchart illustrating steps 32-35 of a method by which energy-transferring circuit 31 enables PDA 10 to generate RC infrared signals 29 with reduced power consumption. The steps of FIG. 5 will now be described in relation to energy-transferring circuit 31 of FIG. 4.

As shown in FIG. 4, energy-transferring circuit 31 includes a diode 36 disposed between a node A and a node B. In this example, diode 36 is a Schottky diode with a 0.3-volt forward drop. Node B is an input node of a power supply system 37 used to power the circuit of FIG. 4. Node B is, in this example, an input of a DC-to-DC converter 38 that converts and conditions battery voltage $V_{BAT}$ into supply voltage $V_{CC}$ used by PDA 10. Power supply 37 is merely a representative power supply system; other power supply systems can be employed. Transmitter LED 18 is an IrDA LED of the IrDA transceiver 11 that is used to generate both RC infrared signals 29 and IrDA signals 30. In this example, inductor 25, first resistor 26, second resistor 28 and diode 36 are each discrete components disposed on a printed circuit board upon which IrDA transceiver 11 is mounted. For example, inductor 25 can be a toroidal coil of copper wire windings over a magnetic core. The magnetic core can be powdered iron or a ferrite, such as nickel-zinc ferrite or manganese-zinc ferrite. The printed circuit board is housed within PDA 10.

In a step 32 of FIG. 5, LED drive current 24 flows from a source of battery voltage $V_{BAT}$, through inductor 25, through node A, through an LED drive current supply terminal 39 and then through transmitter LED 18.

In a step 33 during a the remote control mode, energy is stored in inductor 25. During remote control transmissions, the core of inductor 25 of current-limiting circuit 12 absorbs energy and becomes saturated. A saturated core represents an amount of stored energy.

In a step 34, LED drive current 24 is stopped, and a portion of the energy stored in inductor 25 is transferred to power supply 37. When a field effect transistor (FET) switch 40 of IrDA driver portion 17 within IrDA transceiver 11 cuts off current flow to end an IR burst, LED drive current 24 flowing in IrDA transceiver 11 falls rapidly to zero. Due to the characteristic equation of an inductor ($V=L \cdot dI/dt$), this sudden cut in current through inductor 25 causes a corresponding rapid surge in voltage across inductor 25. This rapid surge in voltage is evident on node A. Due to the operation of the Schottky diode, when the voltage on node A rises more than 0.3 volts above the voltage on node B, an overflow current 41 flows through Schottky diode 36 and to node B. Energy is therefore transferred from inductor 25, through node A, through Schottky diode 36, through node B, and into power supply 37 of PDA 10. This energy flows until the energy-stored in the magnetic field of inductor 25 has been substantially exhausted. The energy that is transferred to power supply 37 is then usable to power circuitry of PDA 10, such as IrDA driver portion 17 and CPU 13. The battery life of PDA 10 is thereby extended.

In a step 35 during the IrDA mode, no appreciable amount of energy is stored in inductor 25 because the core of inductor 25 does not saturate during the relatively shorter IrDA pulses.

Figure 6:
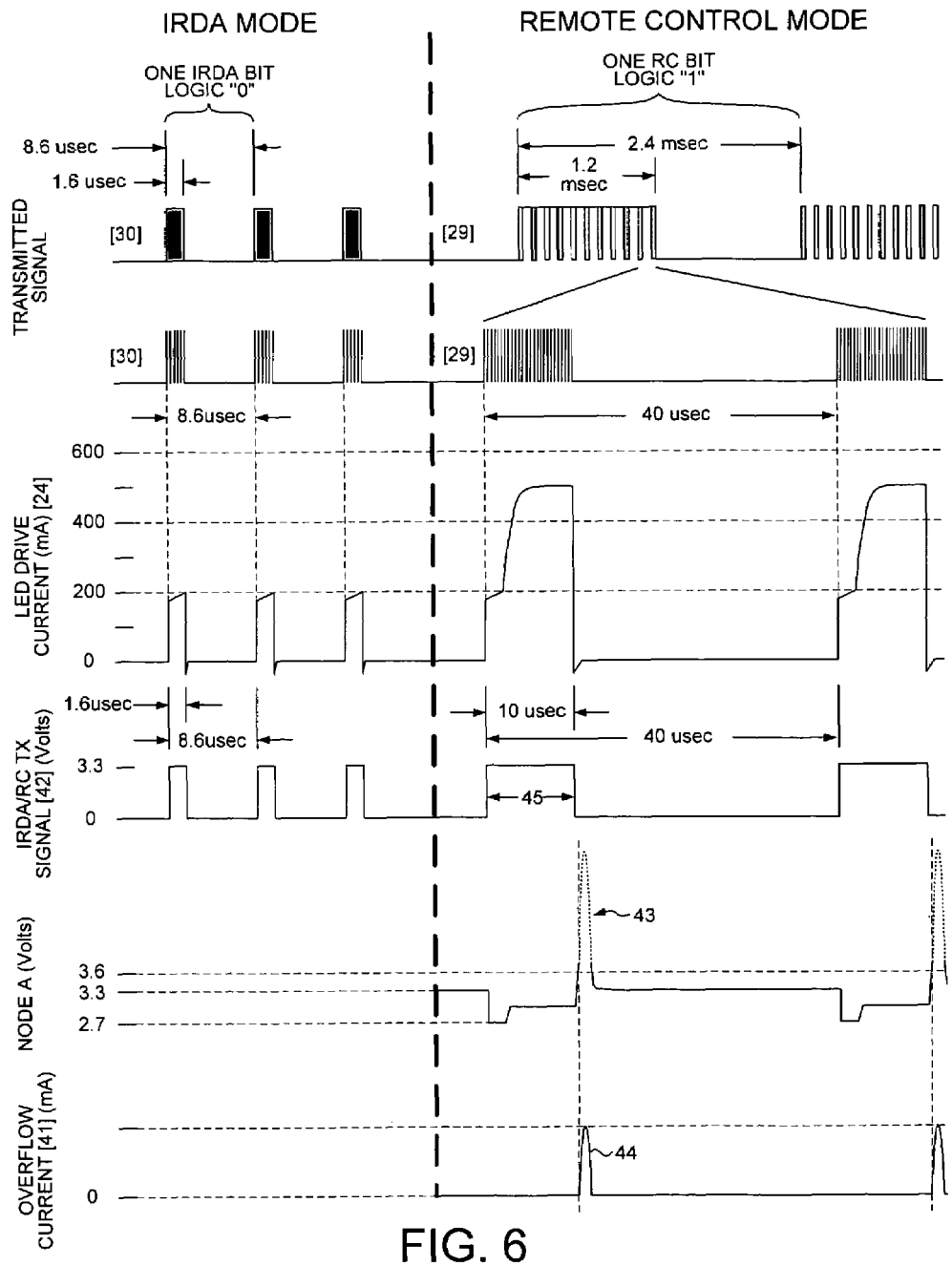
FIG. 6 is a waveform diagram illustrating the operation of the transceiver of FIG. 4 in both an IrDA mode and a remote control mode.

FIG. 6 is a waveform diagram that illustrates the operation of energy-transferring circuit 31 in both the IrDA mode and the remote control mode. The left half of FIG. 6 illustrates a typical IrDA transmission; the right half illustrates a typical remote control transmission. RC infrared signals 29 are transmitted when operating system 14 and CPU 13 generate an RC transmission signal 42 that controls FET switch 40. In step 32, each time FET switch 40 is turned on, a burst of infrared radiation is emitted. Digital ones and zeros are represented by coding and modulating multiple bursts. FIG. 6 includes a waveform illustrating pulses comprising multiple bursts generated by RC transmission signal 42.

FIG. 6 compares the current consumed by transmitter LED 18 in the IrDA mode and the remote control mode. The weighted average peak LED drive current 24 in the IrDA mode is about 195 mA, whereas the weighted average peak LED drive current 24 in the remote control mode is about 400 mA. FIG. 6 illustrates an increase in LED drive current 24 in the remote control mode from about 200 mA to about 500 mA shortly after the core of inductor 25 saturates. More current is required to transmit a bit via an RC infrared signal 29 than via an IrDA signal 30. In step 33, however, when RC infrared signals 29 are produced, some of the energy is stored in the saturated inductor 25. In step 34, this stored energy is conserved and returned to power supply 37.

FIG. 6 illustrates a rapid surge 43 in voltage on node A that follows a sudden cut in current through inductor 25 in the remote control mode. The rapid surge 43 in voltage then produces a current pulse 44 of overflow current 41 when the magnitude of the voltage surge 43 reaches 3.6 volts, which is 0.3 volts above the normal 3.3-volt level of node B. Current pulse 44 of overflow current 41 represents the transfer of energy that is originally stored in inductor 25 and then conserved and transferred to power supply 37. In step 34, current pulse 44 immediately follows the cutting of LED drive current 24 at the end of a pulse 45 of RC transmission signal 42. In this example, pulse 45 occurs during a first time period of ten microseconds during which twenty-six bursts of IR radiation are emitted as LED drive current 24 flows through transmitter LED 18. During a second time period of thirty microseconds, substantially no current flows through transmitter LED 18.

In step 35, during the relatively shorter pulses of the IrDA mode, the core of inductor 25 does not become saturated. Therefore, in the IrDA mode, no appreciable amount of energy is stored in inductor 25 for transferring to power supply 37.

A second aspect of energy-transferring circuit 31 is lower cost. In addition to the energy-conserving characteristics of energy-transferring circuit 31 in the remote control mode, circuit 31 also incorporates a lower cost structure for inductor 25. An inductor that is a discrete component of copper wire windings forming a toroidal coil is more costly to manufacture than is a planar coil of conductive traces on a printed circuit board.

Figure 7A:
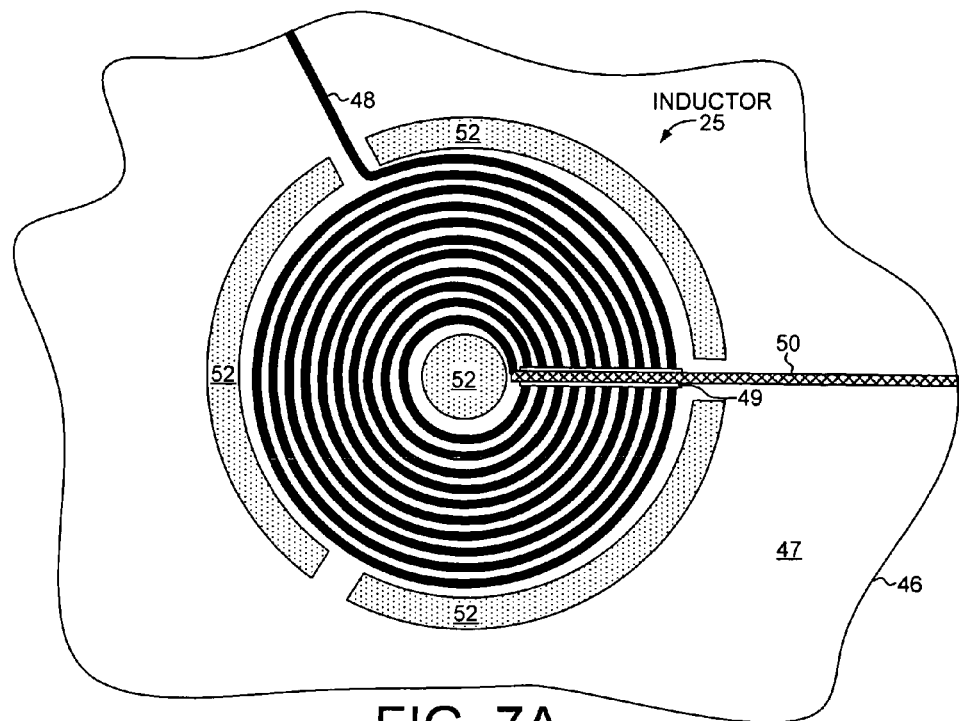
FIG. 7A is a simplified top-down diagram of an embodiment of an inductor in the current-limiting circuit of FIG. 4.

FIG. 7A shows a top-down view of an embodiment of current-limiting circuit 12 in which the coils of inductor 25 are printed on a surface of a printed circuit board 46 of PDA 10. The inductor windings of inductor 25 are realized in three layers of traces on a top surface 47 of printed circuit board 46. Cost is reduced by avoiding the cost of winding a metal wire into a toroid or a bobbin-style coil. First, a spiral trace 48 is printed on top surface 47 of printed circuit board 46. Then an insulating trace 49 is laid across all but the inner-most turn of spiral trace 48. Finally, an output trace 50 is printed over insulating trace 49 such that it makes electrical contact only with the inner-most turn of spiral trace 48.

An "EI core" provides inductor 25 with a magnetic shell 51 that increases the inductance of inductor 25. An "E" portion 52 of magnetic shell 51 fits down through arc-shaped slits in printed circuit board 46 and snaps into an "I" portion 53 on the other side of printed circuit board 46. Magnetic shell 51 is made of a ferrous material, such as powdered iron, nickel-zinc ferrite or manganese-zinc ferrite.

Figure 7B:
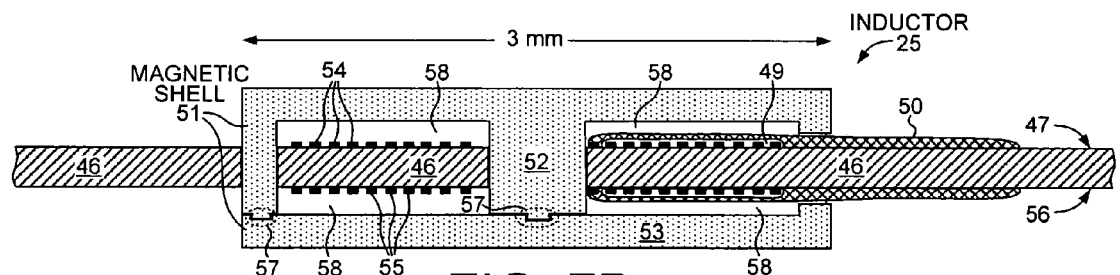
FIG. 7B is a simplified cross-sectional diagram of the inductor of FIG. 7A.

FIG. 7B shows a cross-sectional view of the embodiment of inductor 25 shown in FIG. 7A. In addition to turns 54 of spiral trace 48 on top surface 47 of printed circuit board 46, FIG. 7B also shows analogous turns 55 of a second spiral trace on a bottom surface 56 of printed circuit board 46. In this embodiment, inductor 25 is formed by spiral trace 48 with ten turns on top surface 47 and by a second spiral trace with ten turns on bottom surface 56. In other embodiments, inductor 25 is formed by fourteen to twenty turns on just one side of printed circuit board 46.

FIG. 7B shows that "E" portion 52 and "I" portion 53 completely encapsulate the two spiral traces in a clam-shell fashion. The two portions 52 and 53 of magnetic shell 51 can be manually snapped together during the assembly process using snaps 57. Alternatively, the two portions 52 and 53 can be clipped or glued together. Glue can be placed in the cavities 58.

Figure 7C:
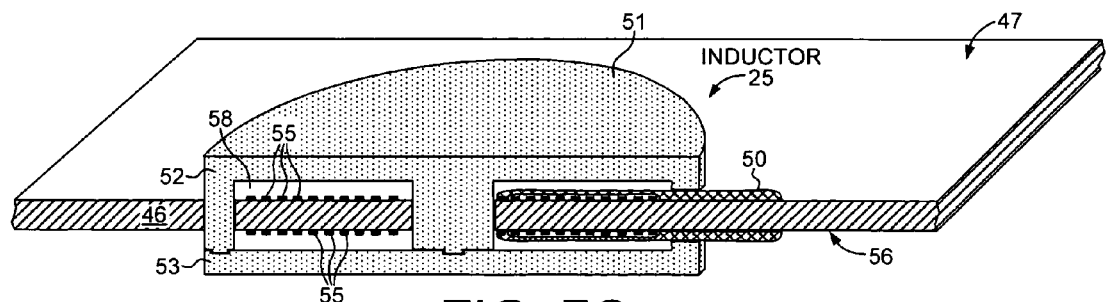
FIG. 7C is a simplified perspective view of the inductor of FIG. 7A.

FIG. 7C shows a perspective view of inductor 25. Although magnetic shell 51 is shown in FIG. 7C in the shape of a disk, other shaped can also effectively encapsulate the spiral traces. For example, the two portions 52 and 53 can have a "1206" square outer form when viewed from a top-down perspective so that they can be grabbed and placed on both sides of printed circuit board 46 by automatic placement equipment.

Figure 8:
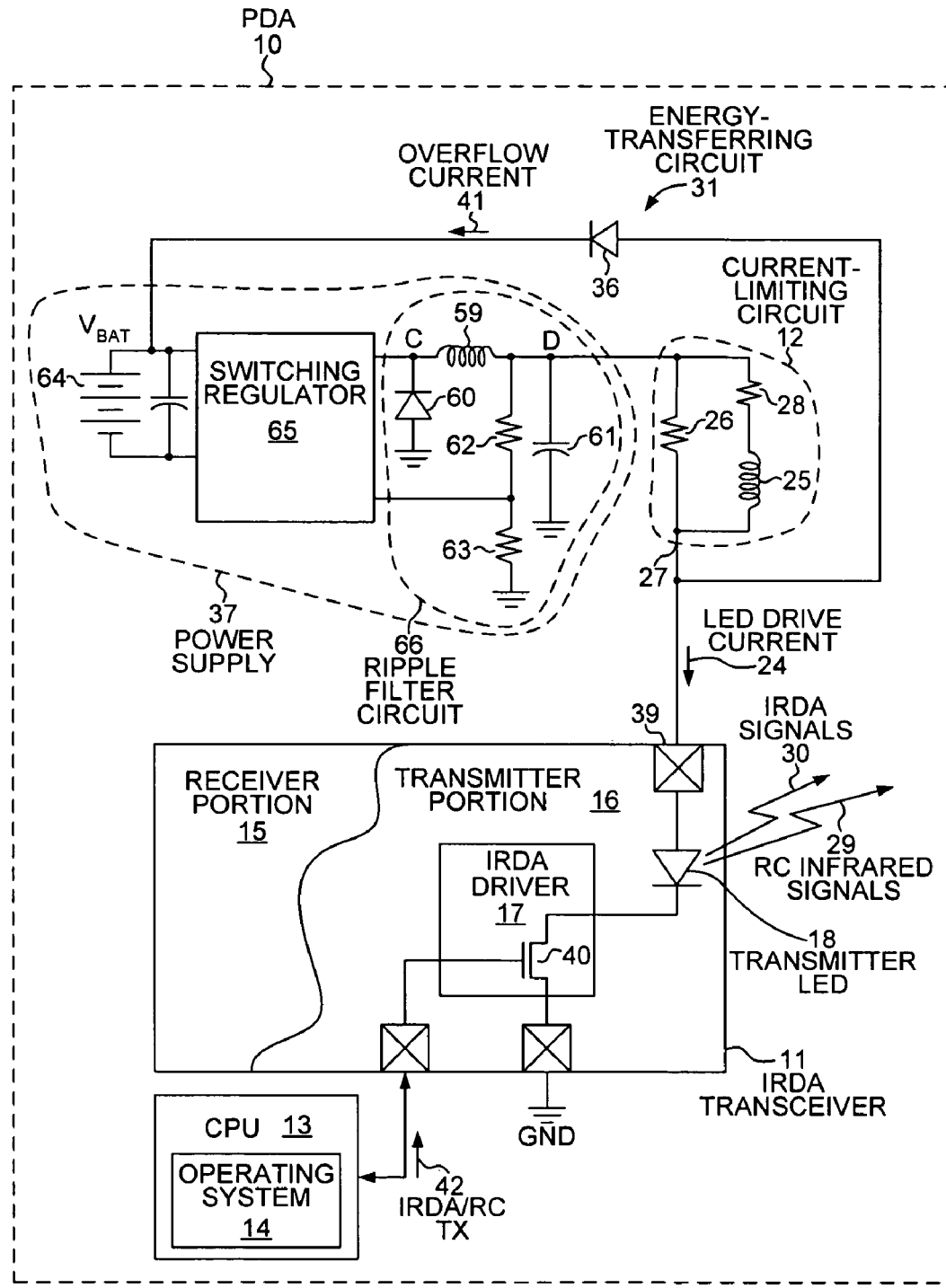
FIG. 8 is a simplified block diagram of a current-limiting circuit and an energy-transferring circuit in accordance with another embodiment of the invention.

FIG. 8 shows yet another embodiment by which energy-transferring circuit 31 enables PDA 10 to generate RC infrared signals 29 with reduced power consumption. This embodiment of energy-transferring circuit 31 includes a second inductor 59, an additional diode 60, a storage capacitor 61 and two resistors 62-63. The circuit of FIG. 8 is powered by a Lithium-ion battery 64, which provides a voltage of between 3.0 and 3.8 volts. An up-down switching regulator 65 regulates battery voltage and outputs current so as to maintain a node C at 3.3 volts. Second inductor 59, diode 60 and storage capacitor 61 make up a ripple filter circuit 66 coupled to the voltage output of switching regulator 63. A node D is disposed between second inductor 59 and capacitor 61.

Energy is stored in the magnetic field of second inductor 59 when current flows through second inductor 59 to node D and saturates second inductor 59. When switching regulator 65 turns off during normal operation, the impedance of the output terminal of switching regulator 65 goes high, thereby effectively disconnecting switching regulator 65 from node C. Second inductor 59, however, causes current to continue to flow out of node C. This current flows from ground, through diode 60 to node C, and through second inductor 59 to node D. This flow of current transfers the energy stored in the magnetic field of second inductor 59 to node D, where it can be stored in storage capacitor 61 and used to power PDA 10.

Current is also pushed through diode 36 when LED drive current 24 is cut and a rapid surge in voltage on output lead 27 of current-limiting circuit 12 produces a current pulse of overflow current 41. Additional energy is conserved when overflow current 41 is dumped into battery 64.

In one example of the circuit of FIG. 8, the components of energy-transferring circuit 31 have the following characteristics: inductor 25 (40 microhenries), first resistor 26 (10 ohms), second resistor 28 (2.5 ohms), second inductor 59 (120 microhenries), storage capacitor 61 (47 microfarads), resistor 62 (10 kilo-ohms), and resistor 63 (3 kilo-ohms).

Although the present invention has been described in connection with certain specific embodiments for instructional purposes, the present invention is not limited thereto. The power supply of the embodiments described above includes a DC-to-DC converter that converts and conditions battery voltage into supply voltage. The energy transferring circuit and the current limiting circuit of the present invention also conserve energy when used with other types of power supplies. For example, the invention can also transfer energy to a power supply comprised of a relatively large capacitor that stores a surge of energy from the overflow current and smoothes out the supply of that energy to circuitry of the portable electronic device. Moreover, the invention is equally applicable to a power supply comprised of a battery and a voltage regulator. Although a fixed inductor is described in the embodiments above, the energy transferring circuit and current limiting circuit can also include a variable inductor. The inductor can be composed of multiple smaller inductors such that the overall inductance can be controlled. The variable inductor could be set to saturate at various current levels.

The energy transferring circuit and current limiting circuit can be used in any application where an inductor is used to limit current flow from a power supply and where the current flow from the power supply is switched on and off. For example, the energy transferring circuit and the current limiting circuit can be used in a mobile handset that transmits radio frequency (RF) signals using a time division multiple access (TDMA) protocol, such as the Global System for Mobile communications (GSM). During GSM signal transmission, the transmitter operates through its entire power range during each time slot. The transmitter ramps up the power level of the RF output signal during the first thirty microseconds of each of the GSM time slots, which occur every 577 microseconds. Then the RF signal power is turned off after each time slot. The energy transferring circuit allows energy to be stored in an inductor when RF signal power is turned on and then conserved and transferred to the power supply of the mobile handset when RF signal power is turned off. Thus, the energy transferring circuit and current limiting circuit allows battery life of a cell phone to be extended. The same energy transferring circuit and current limiting circuit can be used in a combined PDA/mobile handset to supply power to both an IrDA transceiver and an RF transmitter.

Although the LED described above has a peak transmission at 875 nm, other types of LEDs can be used. For example, the LED can have a peak transmission at another wavelength in the infrared spectrum or even in the visible spectrum. Although the energy transferring circuit and the current limiting circuit are described as used in portable electronic devices, the invention is also applicable in large public display boards illuminated by LEDs. Accordingly, various modifications, adaptations, and combinations of various features of the described embodiments can be practiced without departing from the scope of the invention as set forth in the claims.

What is claimed is:

1. A method comprising:
   (a) passing a current through a light emitting diode (LED), said current also passing through an inductor such that energy is stored in said inductor;
   (b) stopping said current from flowing through said LED and transferring at least a portion of said energy stored in said inductor to a power supply; and
   (c) generating an IrDA signal in an IrDA mode, and generating an RC infrared signal in a remote control mode, wherein energy is stored in said inductor in said remote control mode, and wherein no appreciable amount of energy is stored in said inductor in said IrDA mode.

2. The method of claim 1, wherein said LED is a part of an IrDA transceiver, wherein said IrDA transceiver is a part of an electronic consumer device, said power supply being a part of said electronic consumer device and powering circuitry of said electronic consumer device, and wherein said energy transferred to said power supply is used to power said circuitry of said electronic consumer device.

3. The method of claim 1, wherein a diode is used to transfer said energy from said inductor to said power supply, said diode passing a pulse of overflow current into said power supply during (b), said diode passing substantially no current into said power supply during (a).

4. The method of claim 1, wherein said power supply includes a battery.

5. The method of claim 1, wherein said power supply includes a capacitor for storing said energy transferred from said inductor.

6. The method of claim 1, wherein said RC infrared signal controls an electronic consumer device taken from the group consisting of: a television, a stereo radio, a digital video disc player, a video cassette recorder, a set-top cable television box and a set-top satellite box.

7. A circuit comprising:
   a light emitting diode (LED), wherein said LED is a light emitting diode of an IrDA transceiver;
   an inductor that stores energy when a current is flowing through said LED;

a power supply; and
an energy-transferring circuit that transfers at least a portion of said energy from said inductor and to said power supply, wherein said current flowing through said LED flows from a voltage source, through said inductor, through said LED within said IrDA transceiver, through a switch within said IrDA transceiver, and then to ground potential.

8. A circuit comprising:
a light emitting diode (LED);
an inductor that stores energy when a current is flowing through said LED;
a power supply; and
an energy-transferring circuit that transfers at least a portion of said energy from said inductor and to said power supply, wherein, when said current is flowing through said LED, said LED exhibits a peak emission at a wavelength shorter than 880 nanometers and emits more than 50 milliwatts/steradian of optical energy at a wavelength of 900 nanometers.

9. A circuit comprising:
a light emitting diode (LED);
an inductor that stores energy when a current is flowing through said LED;
a power supply; and
an energy-transferring circuit that transfers at least a portion of said energy from said inductor and to said power supply, wherein a first current-limiting resistor is configured in parallel with said inductor and with a second current-limiting resistor, and wherein said second current-limiting resistor is configured in series with said inductor.

10. A circuit comprising:
an inductor that stores energy when a current flows through said inductor;
a power supply; and
an energy-transferring circuit that transfers at least a portion of said energy from said inductor to said power supply, wherein said inductor is a planar coil, wherein said planar coil comprises traces on a printed circuit board, and wherein said traces are enclosed in a magnetic shell.

11. The circuit of claim 10, wherein said circuit generates an RC infrared signal when said current flows through said inductor.

12. The circuit of claim 11, wherein said power supply includes a capacitor for storing said portion of said energy.

13. The circuit of claim 10, wherein said traces are disposed on a top surface of said printed circuit board and on a bottom surface of said printed circuit board.

14. The circuit of claim 10, wherein said magnetic shell comprises a top portion disposed above a top surface of said printed circuit board and a bottom portion disposed entirely below a bottom surface of said printed circuit board.

15. The circuit of claim 10, wherein said magnetic shell is made of a material taken from the group consisting of: powdered iron, nickel-zinc ferrite and manganese-zinc ferrite.

16. The circuit of claim 10, wherein said energy-transferring circuit is part of a portable electronic device taken from the group consisting of: a personal digital assistant (PDA), a cell phone, a portable MP3 player, a pager, a digital camera and a laptop computer.

17. The circuit of claim 10, wherein said energy-transferring circuit comprises a Schottky diode.

18. The circuit of claim 10, further comprising:
a light emitting diode (LED), wherein said inductor stores said energy when said current flows through said LED.

19. A circuit comprising:
an inductor that stores energy when a current flows through said inductor;
a power supply;
an energy-transferring circuit that transfers at least a portion of said energy from said inductor to said power supply, wherein said inductor is a planar coil; and
a light emitting diode (LED), wherein said inductor stores said energy when said current flows through said LED, wherein said LED exhibits a peak emission at a wavelength shorter than 880 nanometers, and wherein said LED emits more than 50 milliwatts/steradian of optical energy at a wavelength of 900 nanometers when said current flows through said inductor.

20. A circuit comprising:
a power supply;
an energy-transferring circuit; and
means for storing energy when a current flows from said power supply through said means to said energy-transferring circuit, wherein at least a portion of said stored energy is transferred from said means to said power supply, and wherein said means comprises traces on a printed circuit board, and wherein said traces are enclosed in a magnetic shell.

21. The circuit of claim 20, further comprising:
a light emitting diode (LED), wherein said means stores said energy when said current flows through said LED.

22. The circuit of claim 20, wherein said means comprises a magnetic core.

23. A circuit comprising:
a battery power supply;
a dual-mode current-limiting circuit comprising an inductor, wherein the dual-mode current-limiting circuit operates in a lower-power mode and in a higher-power mode; and
an energy-transferring circuit, wherein in the higher-power mode the inductor saturates when a longer current pulse flows from the current supply and through the dual-mode current-limiting circuit, wherein in the higher-power mode an overflow current flows through the energy-transferring circuit to the battery power supply when the longer current pulse ends, and wherein in the lower-power mode a shorter current pulse ends before the inductor saturates.

24. The circuit of claim 23, wherein the dual-mode current-limiting circuit further comprises a first current-limiting resistor and a second current-limiting resistor, wherein the first current-limiting resistor and the inductor are configured in parallel, and wherein the second current-limiting resistor and the inductor are configured in series.

25. The circuit of claim 23, wherein the longer current pulse has a magnitude that increases after the inductor saturates.

26. The circuit of claim 23, wherein the energy-transferring circuit comprises a diode.

27. The circuit of claim 23, wherein the battery power supply powers a portable electronic device taken from the group consisting of: a personal digital assistant (PDA), a cell phone, a portable MP3 player, a pager, a digital camera and a laptop computer.

28. The circuit of claim 23, wherein the inductor comprises traces on a printed circuit board.

29. The circuit of claim 23, wherein the inductor has a magnetic core.

* * * * *